United States Patent

[11] 3,612,339

[72] Inventor Svend M. Jorgensen
       Tenafly, N.J.
[21] Appl. No. 826,632
[22] Filed May 21, 1969
[45] Patented Oct. 12, 1971
[73] Assignee Foster Wheeler Corporation
       Livingston, N.J.

[54] PRESSURE VESSEL WITH SHEAR PINS
10 Claims, 7 Drawing Figs.

[52] U.S. Cl. .................................................. 220/46,
       220/55, 220/3, 292/300
[51] Int. Cl. ...................................................... B65d 53/00,
       A47j 27/08, A47j 36/10

[50] Field of Search ........................................... 220/46, 55,
       3; 292/2, 300

[56] References Cited
UNITED STATES PATENTS
3,307,735  3/1967  Latham et al. ................  220/55
3,451,585  6/1969  Jorgensen ....................  220/46

Primary Examiner—George T. Hall
Attorneys—John E. Wilson, John Maier, III and Marvin A. Naigur ABSTRACT: A pressure vessel in which a plurality of shear pins are disposed along an innerface defined between a pair of adjoining vessel components. The studs extend at an angle with respect to the generatrix of the innerface.

INVENTOR.
SVEND M. JORGENSEN
BY
WARREN B. KICE
ATTORNEY

INVENTOR.
SVEND M. JORGENSEN
BY
WARREN B. KICE
ATTORNEY

PRESSURE VESSEL WITH SHEAR PINS

BACKGROUND OF THE INVENTION

This invention relates to a pressure vessel, and, more particularly, to a pressure vessel in which two adjoining vessel components are fixed together in an improved manner.

In process plants and other environments which require high pressure vessels, many of these vessels, such as reactors, converters, etc., require full size end openings having closures which are removable to permit insertion and withdrawal of external material, equipment, etc. Also, these vessels are often of a size and weight which require then to be constructed of two or more shell members.

Several proposals have been made to connect the closures to the vessels and the shell members to each other. One of the most conventional arrangements utilizes a bolted flange unit with stud bolts attached to a flange at the end of a vessel shell. However, the disadvantages of these type arrangements are numerous. For example, the cost is disproportionally large compared with the total vessel cost, the handling of these units require special equipment, and the size of the complete vessel is unmanageable. Furthermore, the assembling and disassembling of the units is cumbersome and time consuming, as well as being impractical and uneconomical beyond certain limits or size and/or pressure.

Shear block and breech designs have also been suggested, but their use is restricted, due to high rotary and bending moments which occur with respect to a groove which is machined in a counterbore formed in one of the units. In order to attempt to overcome these moments, cooperating threads have been provided on the two units. However, in fairly large size vessels, severe machining difficulties are encountered in the threading due to the fact that the male and female threads are threaded from different type machines, and the small differences in thread pitch add up rapidly over a number of threads. This could result in most of the load being carried on a very few threads, thus causing very high stress concentration.

It was further suggested to utilize a plurality of multiple threaded shear members located in the annular space, or interface, between the two vessel units. This arrangement resulted in many advantages from a drilling and tapping design standpoint, but was found to be relatively expensive in material and costs, and, just as important, required a relatively long time to assemble and remove the shear members from the cylinder.

SUMMARY OF THE INVENTION

It is therefore an object of the present invention to provide a pressure vessel in which two adjoining vessel components may be quickly assembled and disassembled.

It is a further object of the present invention to provide a pressure vessel of the above type which is relatively inexpensive in manufacturing and assembly costs.

Briefly summarized, the pressure vessel of the present invention comprises a first vessel member having at least one open end, a second vessel member for attaching to the open end to define an interface with the first member, and a plurality of shear studs having a smooth outer surface disposed along said interface, said studs extending at an angle with respect to the generatrix of said interface.

BRIEF DESCRIPTION OF THE DRAWINGS

Reference is now made to the accompanying drawings for a better understanding of the nature and objects of the pressure vessel of the present invention, which drawings illustrate the best mode presently contemplated for carrying out the objects of the invention and its principles, and are not to be construed as restrictions or limitations on its scope. In the drawings.

DESCRIPTION OF THE PREFERRED EMBODIMENTS

Figure 1:
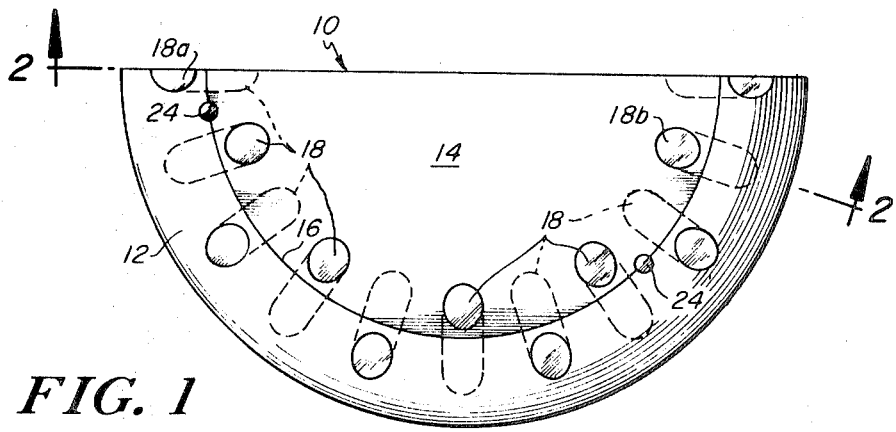
FIG. 1 is a partial top plan view of a pressure vessel constructed according to the present invention.
Figure 2:
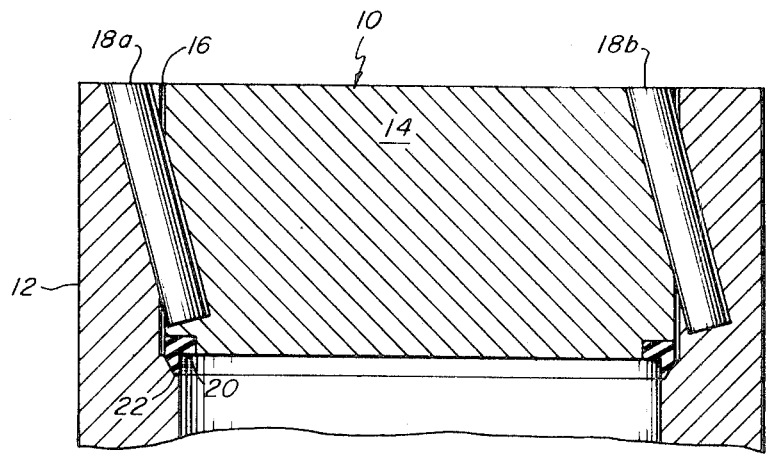
FIG. 2 is a transverse sectional view taken along the line 2—2 of FIG. 1.

Referring specifically to the embodiment of FIGS. 1 and 2, the reference numeral 10 refers, in general, to a pressure vessel which consists of an outer shell 12 having an open end which receives a removable closure plug 14. The shell and the plug are of a generally cylindrical shape, and the outside diameter of the plug is of a slightly less diameter than the inner diameter of the shell, and defines a cylindrical innerface 16 with the shell.

A plurality of bores are formed in the vessel, each extending through the shell 12 and the plug 14 across the innerface 16. The bores are adapted to receive a plurality of shear studs 18, each having a smooth outer surface and a constant cylindrical cross section. The bores, and therefore the shear studs, extend at an angle to the generatrix of the interface and at an angle to the axis of the vessel, and are alternately positioned to extend in different radial directions. For example, as shown in FIG. 2, every other one of the studs, as represented by stud 18a, extends from the shell 12 across the innerface 16 and into the plug 14 while the remaining studs, as represented by stud 18b, extend from the plug 14 across the innerface 16 and into the shell 12.

This alternate spacing of the studs creates an evenly distributed load along the innerface which prevents bending moments to occur on the shell 12 in an outwardly direction which, in turn, may cause bursting of the vessel.

The vessel is closed by inserting the closure plug 16 into the open end of the shell 12 until a sealing member 20 (FIG. 2), fitted within a groove formed in the plug member 14, and having a lip member formed thereon, engages with a shoulder 22 formed on the inner surface of the shell member.

After the closure plug has been placed in the shell, three pin holes are drilled in the innerface, and dowel pins 24 (FIG. 1) are inserted therein to fix the plug with respect to the shell for drilling the innerface shear stud bores.

It can be appreciated that, due to the presence of the shoulder stop 22 as well as the dowel pins 24, the plug 14, after being removed, can easily be put back into its identical original position, in order to properly match the bores extending through the shell and the plug.

Although the shear studs 18 are shown extending flush with the top of the plug 14, it is understood that they can be designed to project slightly outwardly from the plug to facilitate removal. Also, a handle, or the like, can be fitted to the top end of each stud in either of the above arrangements, if desired.

The magnitude of the angle that each shear stud 18 extends to the axis of the vessel can be varied in accordance with the particular design requirements of the vessel, with certain restrictions. For example, below a certain minimum angle the studs would pop out along with the plug under a predetermined hydrostatic load. Also, it can be appreciated that if the studs were inclined at a 90° angle to the axis of the vessel, the plug would be effectively locked to the shell, but since only the cross-sectional area of the studs would apply the effective locking force, a prohibitively large number of studs would be required.

With the above in mind, it can be appreciated that the plugs can otherwise take an innumerable combination of relative positions along the innerface.

Figure 3:
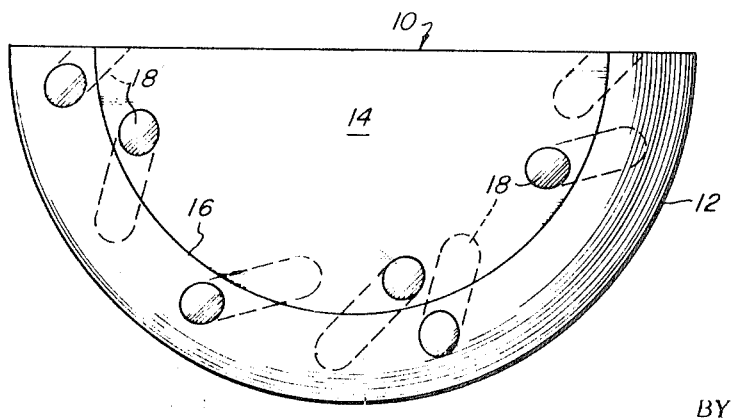
FIG. 3 is a view similar to FIG. 1 but showing a different arrangement of the shear studs.
Figure 4:
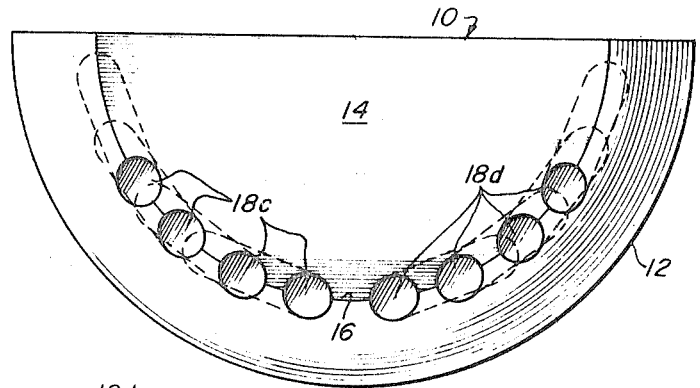
FIG. 4 is a view similar to FIG. 1 but showing still another arrangement of the shear studs.
Figure 5:
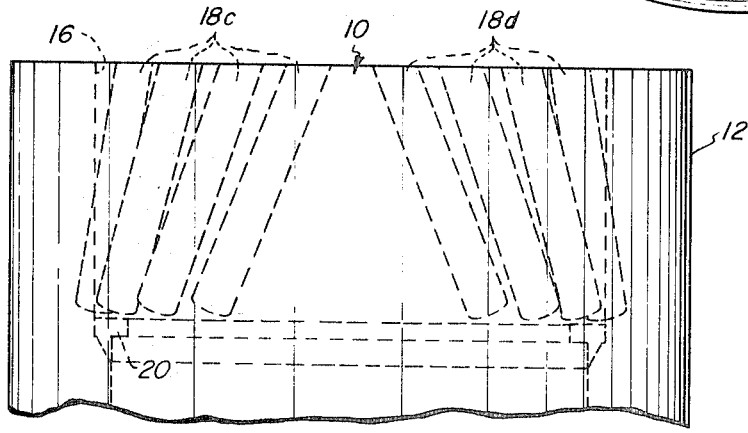
FIG. 5 is a front elevational view of the arrangement of FIG. 4.

For example, FIGS. 3–5 show other angular arrangements of the shear studs 18 and, since the structure is identical to that described in connection with the embodiments of FIGS. 1 and 2, similar reference numerals will be utilized. As shown in FIG. 3, the studs 18 are positioned in a random pattern with alternate studs extending from the shell 12 through the innerface 16 to the plug 14, and the remaining studs extending in an opposite direction. In this arrangement, the studs do not necessarily extend in a radial direction, and can be grouped as shown.

In the embodiment of FIGS. 4 and 5 the studs 18 are positioned tangent to the innerface 16 while extending at an angle with respect to the generatrix thereof. The studs are grouped into two groups with a first group, shown by the reference numeral 18c, extending in one circumferential direction along the interface 16 as viewed in FIG. 4, and a second group 18d extending in an opposite direction.

Figure 6:
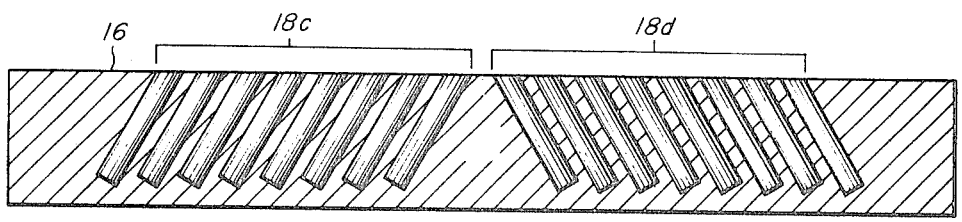
FIGS. 6 and 7 are developed views of the plug and vessel wall interface, showing two possible arrangements of shear studs.

FIG. 6 is a developed view of the interface of the embodiment of FIGS. 4 and 5, and better shows the angular position of the studs of each group 18c and 18d.

Figure 7:
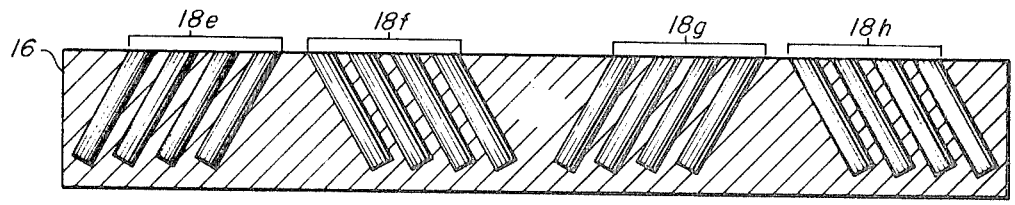

Still another possible stud arrangement is depicted in the developed interface view of FIG. 7. This arrangement is similar to that of the embodiments of FIGS. 4–6, with the exception that the studs 18 are divided into four groups 18e, 18f, 18g, and 18h, with the groups alternately extending in opposite directions. As in the previous embodiment, each stud extends tangent to the innerface 16 at an angle to the generatrix of the innerface.

The advantages of the arrangement of FIGS. 4–7 are many. For example, the positioning of the studs into two or more groups extending in opposite circumferential directions along the innerface prevents the plug 14 from twisting out of the shell 12 under a hydrostatic load. Also, the tangential disposition of the studs with respect to the innerface results in an increased shear area while minimizing the possibility of the plug popping out of the shell.

In addition to the advantages discussed above, the present invention permits several additional advantages in manufacturing and assembly. For example, the use of smooth surfaced studs frictionally fitting into their corresponding bores enables the closure plug to be quickly and easily removed from the shell with a minimum of labor, and enables the complete pressure vessel to be relatively inexpensive in cost and materials. Also, tapping of the bores is eliminated and each bore can be drilled with the same drill press, so that the tolerance between the plug and the shell member in each bore is the same. Further, the joint is more advantageous for large thick walled vessels which have to be opened frequently in a relatively short period of time.

It is understood that the fastening of a closure plug within the vessel shell member has been described only by means of example, and that the scope of the invention includes other related environments, such as the attachment of a semispherical closures to vessel shells, and the attachment of two shell portions, etc.

Of course, other variations of the specific construction and arrangement of the pressure vessel disclosed above can be made by those skilled in the art without departing from the invention as defined in the appended claims.

1. A pressure vessel comprising a first member having at least one open end, a second member for attaching to said first member at said open end to define an interface between said members, and a plurality of shear studs having a smooth outer surface disposed along said interface, said studs extending at an angle with respect to the generatrix of said interface.

2. The vessel of claim 1 wherein said first member is in the form of a shell, and said second member is in the form of a closure plug fitting into said open end of said shell.

3. The vessel of claim 1 wherein said first member and said second member are cylindrical.

4. The vessel of claim 3 wherein said studs extend tangential to said interface.

5. The vessel of claim 1 wherein said studs extend at an angle with respect to the axis of said first member.

6. The vessel of claim 1 further comprising sealing means extending between said first member and said second member.

7. A pressure vessel comprising a cylindrical shell member having at least one open end, a cylindrical closure plug for fitting into said open end and defining an interface with the inner surface of said shell member, and a plurality of shear studs disposed along said interface, said studs extending at an angle with respect to the generatrix of said shell member.

8. The vessel of claim 7 wherein said studs extend tangent to said interface.

9. The vessel of claim 7 wherein said studs extend at an angle with respect to the axis of said shell member.

10. The vessel of claim 7 further comprising sealing means extending between said shell member and said closure plug.